United States Patent
Encalarde

(10) Patent No.: US 11,622,551 B2
(45) Date of Patent: Apr. 11, 2023

(54) FISH BUCKET ASSEMBLY

(71) Applicant: Daymond Encalarde, Arlington, TX (US)

(72) Inventor: Daymond Encalarde, Arlington, TX (US)

( * ) Notice: Subject to any disclaimer, the term of this patent is extended or adjusted under 35 U.S.C. 154(b) by 0 days.

(21) Appl. No.: 17/341,493

(22) Filed: Jun. 8, 2021

(65) Prior Publication Data

US 2022/0386581 A1    Dec. 8, 2022

(51) Int. Cl.
*A01K 97/20*    (2006.01)

(52) U.S. Cl.
CPC .................................... *A01K 97/20* (2013.01)

(58) Field of Classification Search
CPC ........ A01K 97/20; A01K 97/05; A01K 97/04; A01K 97/00; A01K 97/045; A01K 63/02
See application file for complete search history.

(56) References Cited

U.S. PATENT DOCUMENTS

| | | |
|---|---|---|
| 2,722,770 A | 11/1955 | Giordano |
| 3,478,463 A | 11/1969 | Ruter |
| 3,919,803 A | 11/1975 | Manguso |
| 4,554,757 A * | 11/1985 | Sakuta .................. A01K 97/04 43/55 |
| 4,570,374 A | 2/1986 | Baxley |
| D471,249 S | 3/2003 | Walters |
| 6,662,488 B1 * | 12/2003 | Heimbrock ............ A01K 97/20 43/55 |
| D540,418 S | 4/2007 | Walters |
| 7,549,697 B1 | 11/2009 | Long |
| 11,317,617 B1 * | 5/2022 | Myers .................... A01K 97/05 |
| 2008/0307693 A1 | 12/2008 | Wessels |
| 2009/0119976 A1 * | 5/2009 | Allen .................... A01K 97/05 43/55 |
| 2015/0082686 A1 | 3/2015 | Merritt |

* cited by examiner

*Primary Examiner* — Joshua E Rodden
*Assistant Examiner* — Henry Hooper Mudd

(57) ABSTRACT

A fish bucket assembly for containing fish caught while fishing includes a bucket that has a plurality of apertures each extending into an interior of the bucket to pass water into the bucket for sustaining a fish in the bucket. A toroid is positioned around the bucket and the toroid is comprised of a buoyant material to facilitate the bucket to float in water for keeping the fish alive in the bucket. A lid is removably attachable to the bucket for closing the bucket. The lid has a hole extending through the lid to facilitate the fish to pass through the hole to deposit the fish in the bucket. A chute is coupled to the lid to direct the fish into the bucket.

3 Claims, 6 Drawing Sheets

FISH BUCKET ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to fish bucket devices and more particularly pertains to a new fish bucket device for containing fish caught while fishing. The device includes a bucket that is foraminous and a float positioned around the bucket for floating the bucket in water. In this way a fish can be stored in the bucket during fishing. A lid is included and a chute is coupled to the lid such that the fish can be placed in the chute to deposit the fish in the bucket.

(2) Description of Related Art Including Information Disclosed Under 37 CFR 1.97 and 1.98

The prior art relates to fish bucket devices including a variety of mesh containers that have a floatation element for storing fish while floating in water. The prior art discloses a bucket that has a foraminous lid for storing fish. The prior art discloses a foraminous basket that includes a floatation ring for storing fish while floating in water.

BRIEF SUMMARY OF THE INVENTION

An embodiment of the disclosure meets the needs presented above by generally comprising a bucket that has a plurality of apertures each extending into an interior of the bucket to pass water into the bucket for sustaining a fish in the bucket. A toroid is positioned around the bucket and the toroid is comprised of a buoyant material to facilitate the bucket to float in water for keeping the fish alive in the bucket. A lid is removably attachable to the bucket for closing the bucket. The lid has a hole extending through the lid to facilitate the fish to pass through the hole to deposit the fish in the bucket. A chute is coupled to the lid to direct the fish into the bucket.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
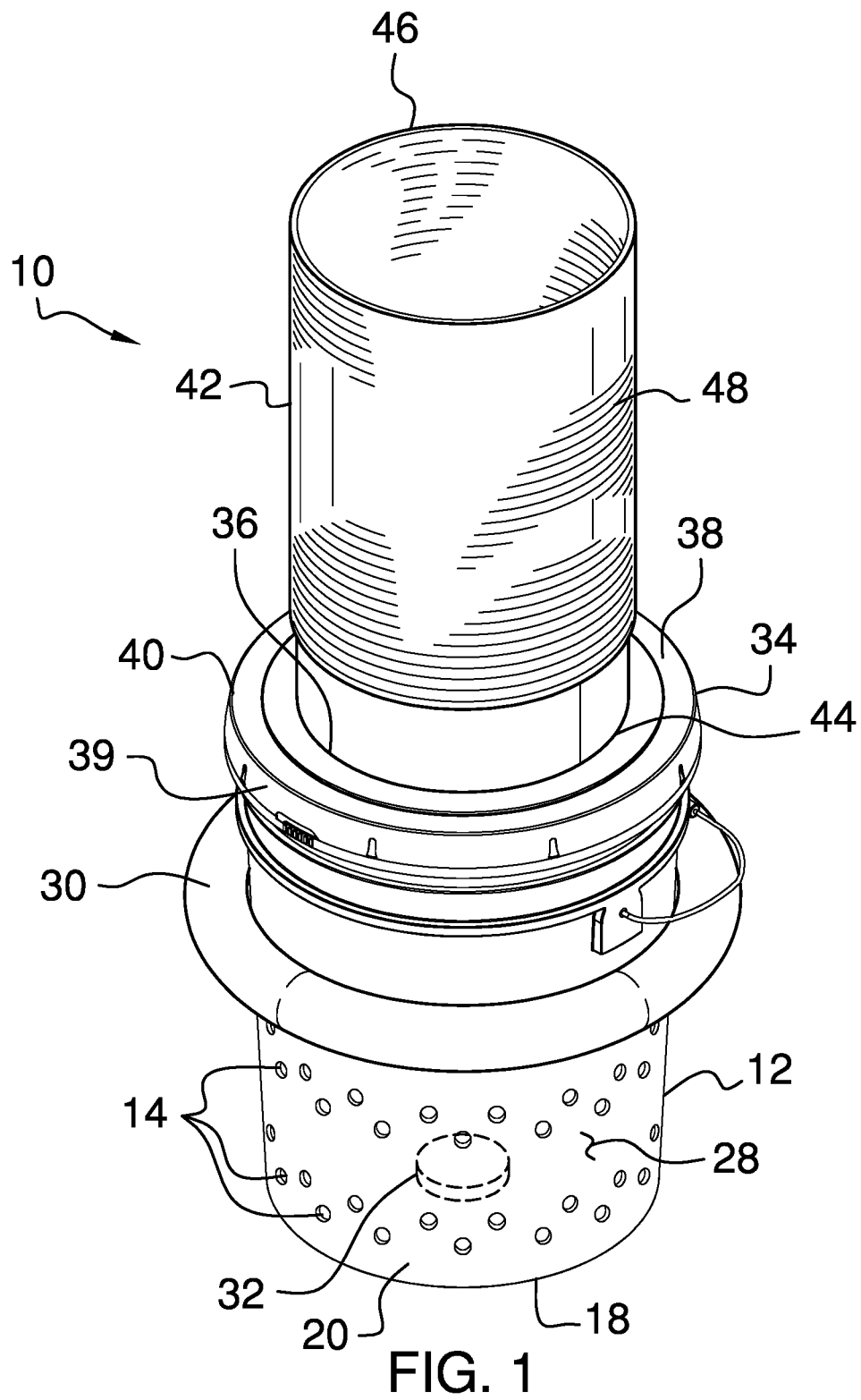
FIG. 1 is a perspective view of a fish bucket assembly according to an embodiment of the disclosure.
Figure 2:
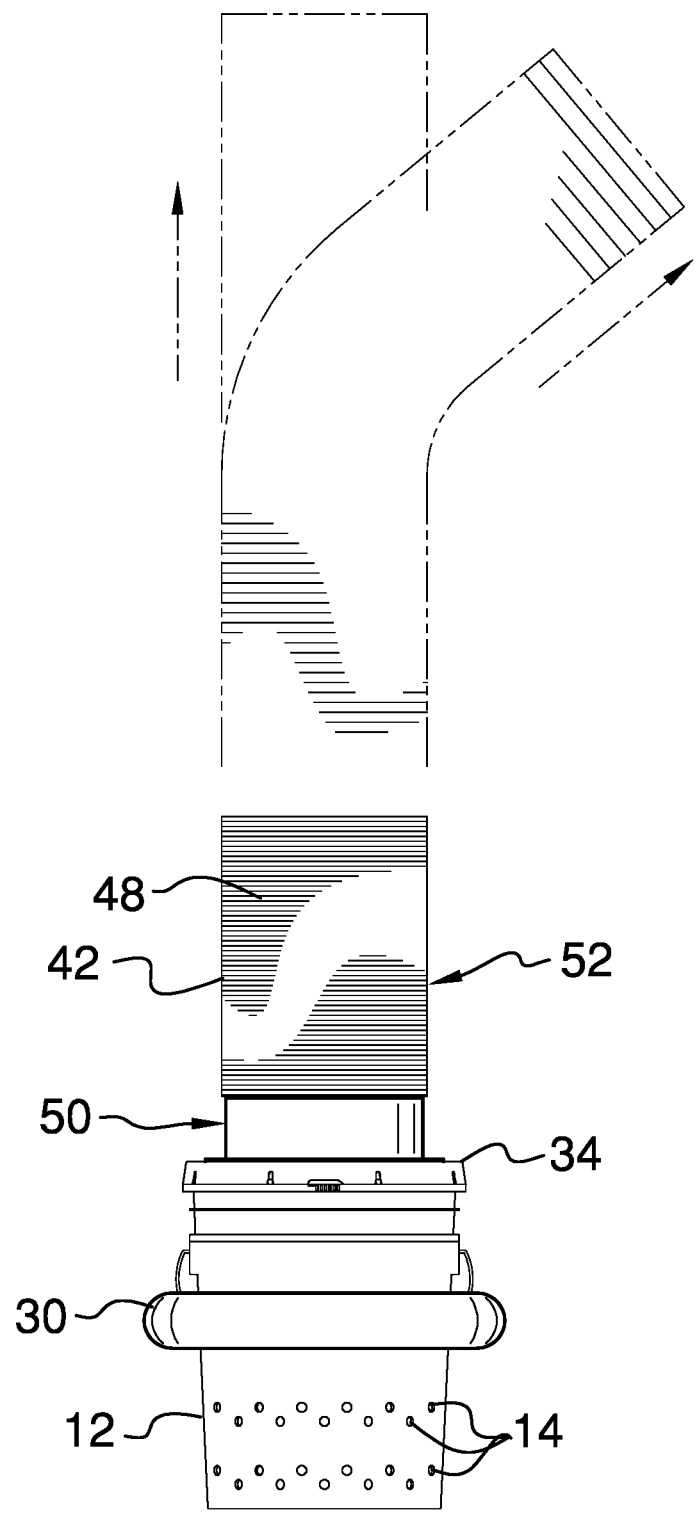
FIG. 2 is a front view of an embodiment of the disclosure.
Figure 3:
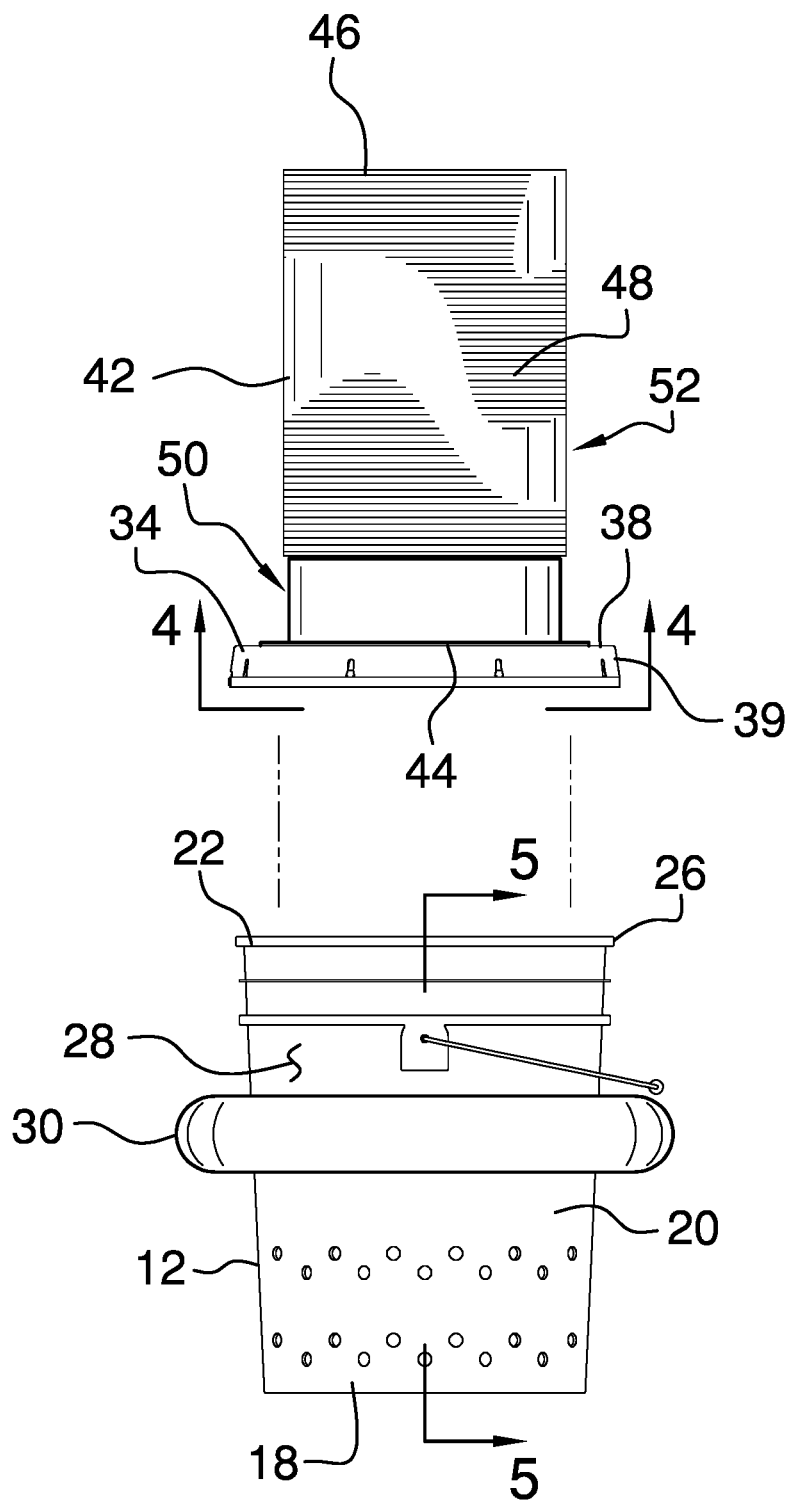
FIG. 3 is a front exploded view of an embodiment of the disclosure.
Figure 4:
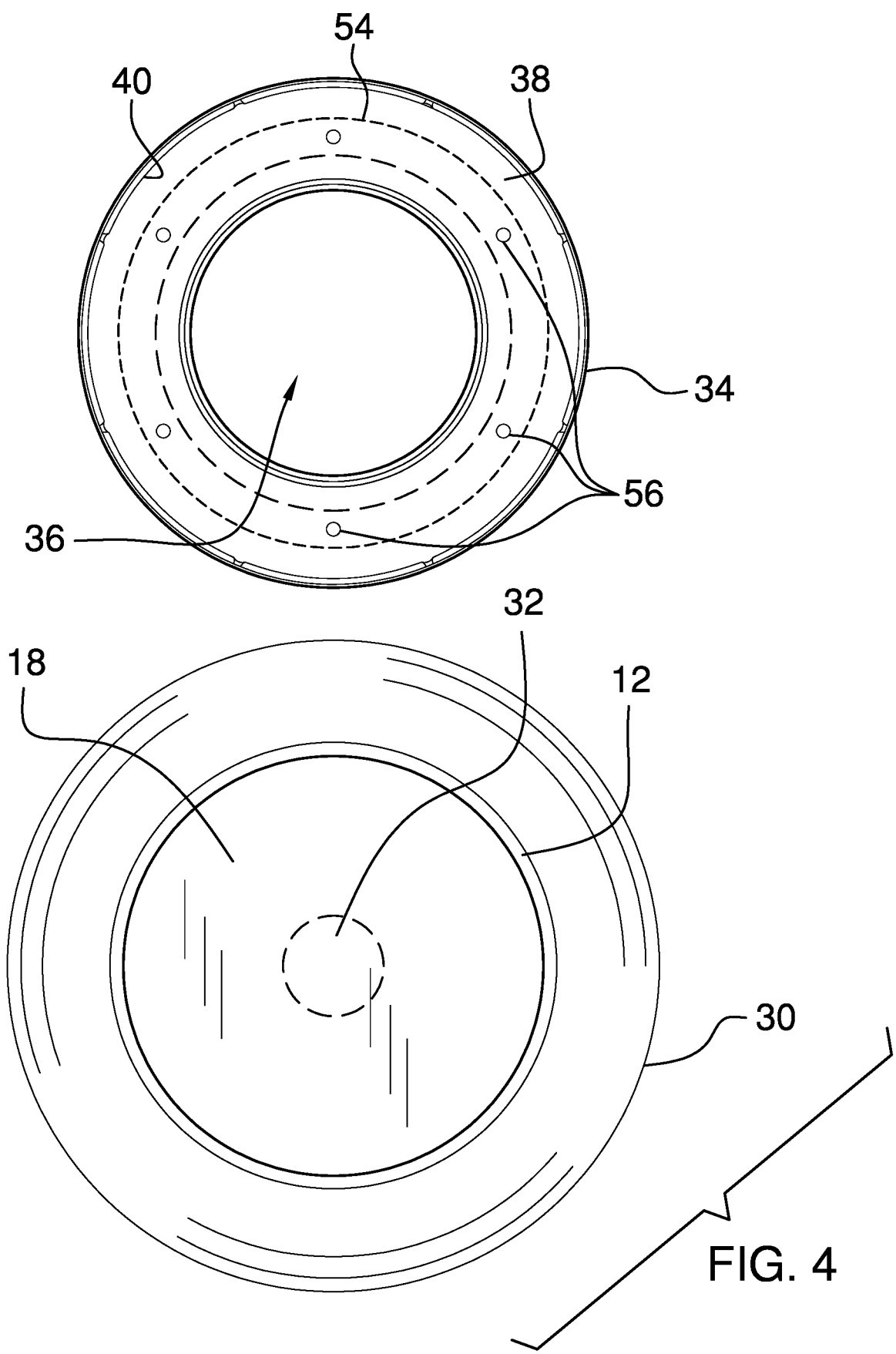
FIG. 4 is a bottom view of a bucket and a lid of an embodiment of the disclosure.
Figure 5:
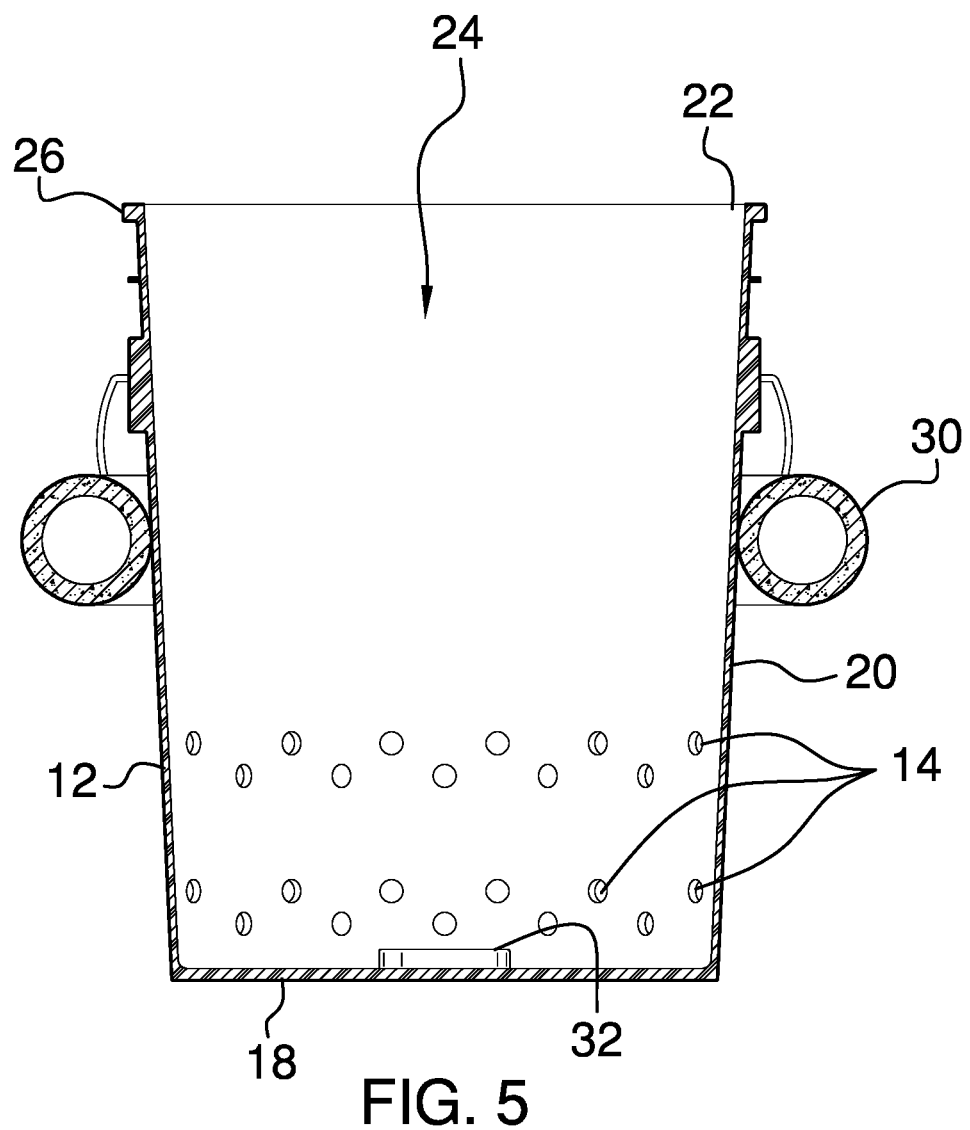
FIG. 5 is a cross sectional view taken along line 5-5 of FIG. 3 of an embodiment of the disclosure.
Figure 6:
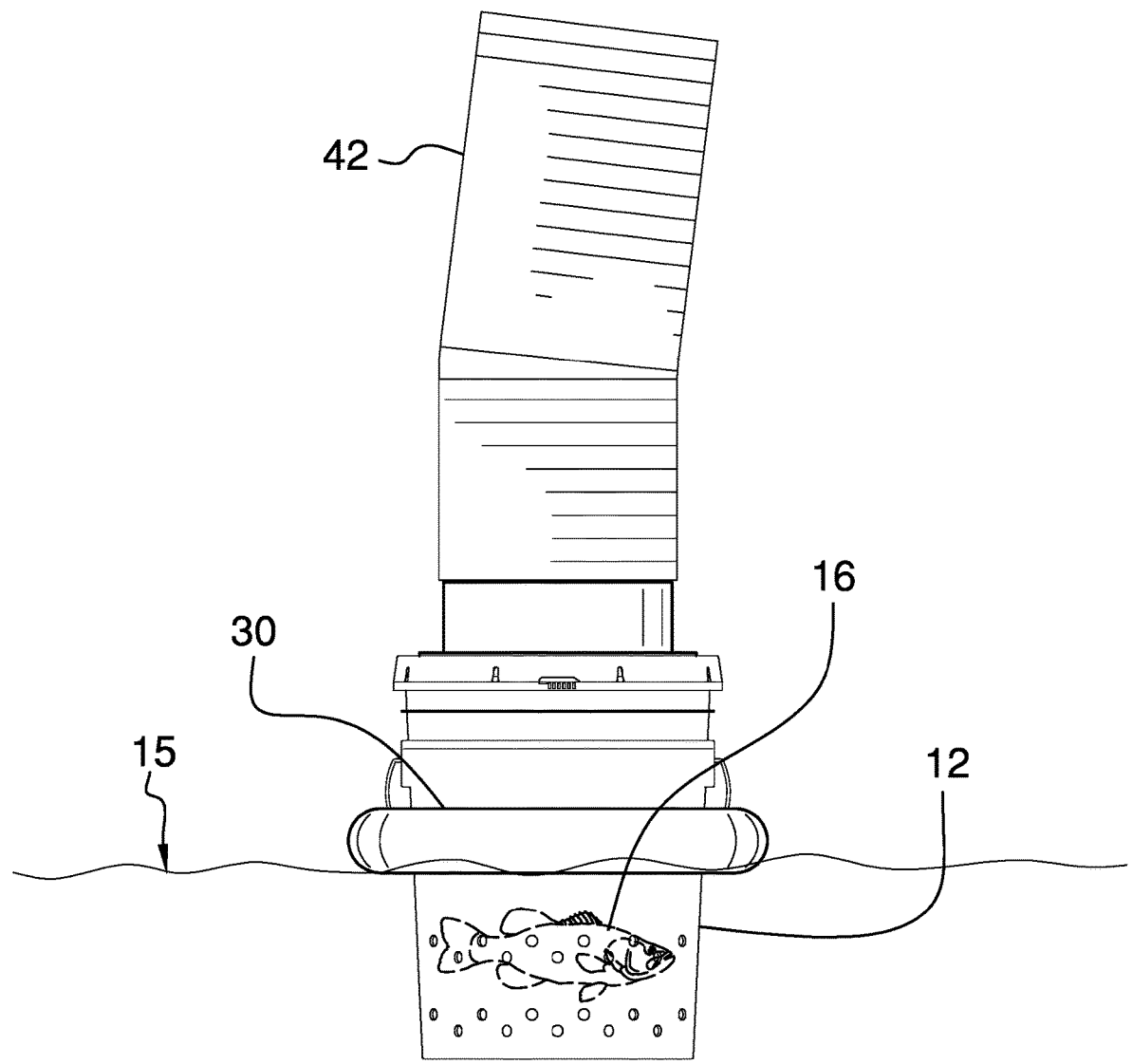
FIG. 6 is a perspective in-use view of an embodiment of the disclosure.

With reference now to the drawings, and in particular to FIGS. 1 through 6 thereof, a new bucket device embodying the principles and concepts of an embodiment of the disclosure and generally designated by the reference numeral 10 will be described.

As best illustrated in FIGS. 1 through 6, the fish bucket assembly 10 generally comprises a bucket 12 that has a plurality of apertures 14 each extending into an interior of the bucket 12. The plurality of apertures 14 pass water 15 into the bucket 12 for sustaining a fish 16 in the bucket 12. The bucket 12 has a bottom wall 18 and an outer wall 20 extending upwardly from the bottom wall 18, and the outer wall 20 has a top edge 22 defining an opening 24 into the bucket 12. The outer wall 20 has a lip 26 extending outwardly from an outer surface 28 of the outer wall 20, and the lip 26 is positioned adjacent to the top edge 22. The bucket 12 may be a five gallon bucket or other container of similar dimensions.

A toroid 30 is provided and the toroid 30 is positioned around the bucket 12. The toroid 30 is comprised of a buoyant material to facilitate the bucket 12 to float in water 15 for keeping the fish 16 alive in the bucket 12. The toroid 30 extends around the outer wall 20 of the bucket 12 at a point that is positioned closer to the top edge 22 than the bottom wall 18. In this way the toroid 30 can retain the bucket 12 in an upright position when the bucket 12 is floating. Additionally, a weight 32 is positioned in the bucket 12 to lower the center of gravity of the bucket 12 to inhibit the bucket 12 from tipping over when the bucket 12 it floating. Moreover, the weight 32 is integrated into the bottom wall 18 of the bucket 12 and the weight 32 may have a weight 32 of approximately 2.0 pounds.

A lid 34 is removably attachable to the bucket 12 for closing the bucket 12. The lid 34 has a hole 36 extending through the lid 34 to facilitate the fish 16 to pass through the hole 36 for depositing the fish 16 in the bucket 12. The lid 34 has a primary wall 38 and a lip 39 extending downwardly from a perimeter edge 40 of the primary wall 38, and the lip 39 on the primary wall 38 releasably engages the lip 26 on the outer wall 20 of the bucket 12. The hole 36 extends through the primary wall 38 and the hole 36 is centrally positioned on the primary wall 38. A chute 42 is coupled to the lid 34 and the fish 16 can be placed into the chute 42 for directing the fish 16 into the bucket 12. The chute 42 is comprised of a flexible material thereby facilitating the chute 42 to be oriented at a variety of angles with the lid 34. In this way the chute 42 inhibits the fish 16 from being able to escape the bucket 12 while enhancing the ease with which the fish 16 can be deposited into the bucket 12.

The chute 42 has a bottom end 44, a top end 46 and an outside wall 48 extending between the bottom end 44 and the top end 46. The outside wall 48 has a rigid portion 50 and a flexible portion 52, and the rigid portion 50 extends from the bottom end 44 toward the top end 46. The flexible portion forms accordion-like folds such that the flexible portion is extendable and bendable. The bottom end 44 is coupled to the primary wall 38 and the chute 42 extends upwardly from the lid 34, and the bottom end 44 is aligned with the hole 36. As is most clearly shown in FIG. 4, a flange 54 may extend around the bottom end 44 of the chute 42 and the flange 54 may have a plurality of fasteners 56, such as screws or the like, extending through the flange 54 and engaging the primary wall 38 of the lid 34. In this way the chute 42 might be removably attached to the lid 34.

In use, the bucket 12 is placed in a body of water 15 such that the bucket 12 fills with water 15. A fish 16 is placed into the chute 42 when the fish 16 is caught during fishing. In this way the fish 16 can be kept alive in the bucket 12 for an indeterminate amount of time. Additionally, the bucket 12 protects the fish 16 from predators that could otherwise consume the fish 16 if the fish 16 were stored on a stringer, for example, or in any other conventional means. The location of the toroid 30 on the bucket 12 and the weight 32 ensure that the bucket 12 remains in an upright position when the bucket 12 is floating in the body of water 15.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A fish bucket assembly for keeping fish alive during fishing, said assembly comprising:

a bucket having a plurality of apertures each extending into an interior of said bucket wherein said plurality of apertures is configured to pass water into said bucket for sustaining a fish in said bucket;

a toroid being positioned around said bucket, said toroid being comprised of a buoyant material wherein said toroid is configured to facilitate said bucket to float in water for keeping the fish alive in said bucket;

a lid being removably attachable to said bucket for closing said bucket, said lid having a hole extending through said lid wherein said hole is configured to facilitate the fish to pass through said hole to deposit the fish in said bucket;

a chute being coupled to said lid wherein said chute is configured to have the fish positioned therein to direct the fish into said bucket, said chute being comprised of a flexible material thereby facilitating said chute to be oriented at a variety of angles with said lid, said chute being extendable;

said bucket has a bottom wall and an outer wall extending upwardly from said bottom wall, said outer wall having a top edge defining an opening into said bucket, said outer wall having a lip extending outwardly from an outer surface of said outer wall, said lip being positioned adjacent to said top edge, each of said apertures extending through said outer wall; and said toroid extends around said outer wall of said bucket at a point being positioned closer to said top edge than said bottom wall wherein said toroid is configured to retain said bucket in an upright position when said bucket is floating; and wherein said chute has a bottom end, a top end and an outside wall extending between said bottom end and said top end, said outside wall having a rigid portion and a flexible portion, said rigid portion extending from said bottom end toward said top end, said bottom end being coupled to said primary wall having said chute extending upwardly from said lid, said bottom end being aligned with said hole, said flexible portion forming accordion-like folds such that said flexible portion is extendable and bendable.

2. The assembly according to claim 1, further comprising a weight being positioned in said bucket to lower the center of gravity of said bucket wherein said weight is configured to inhibit said bucket from tipping over when said bucket it floating.

3. A fish bucket assembly for keeping fish alive during fishing, said assembly comprising:

a bucket having a plurality of apertures each extending into an interior of said bucket wherein said plurality of apertures is configured to pass water into said bucket for sustaining a fish in said bucket, said bucket having a bottom wall and an outer wall extending upwardly from said bottom wall, said outer wall having a top edge defining an opening into said bucket, said outer wall having a lip extending outwardly from an outer surface of said outer wall, said lip being positioned adjacent to said top edge, each of said apertures extending through said outer wall;

a toroid being positioned around said bucket, said toroid being comprised of a buoyant material wherein said toroid is configured to facilitate said bucket to float in water for keeping the fish alive in said bucket, said toroid extending around said outer wall of said bucket at a point being positioned closer to said top edge than said bottom wall wherein said toroid is configured to retain said bucket in an upright position when said bucket is floating;

a weight being positioned in said bucket to lower the center of gravity of said bucket wherein said weight is configured to inhibit said bucket from tipping over when said bucket is floating, said weight being integrated into said bottom wall of said bucket;

a lid being removably attachable to said bucket for closing said bucket, said lid having a hole extending through said lid wherein said hole is configured to facilitate the fish to pass through said hole to deposit the fish in said bucket, said lid having a primary wall and a lip extending downwardly from a perimeter edge of said primary wall, said lip on said primary wall releasably engaging said lip on said outer wall of said bucket, said hole extending through said primary wall, said hole being centrally positioned on said primary wall; and a chute being coupled to said lid wherein said chute is configured to have the fish positioned therein to direct the fish into said bucket, said chute being comprised of a flexible material thereby facilitating said chute to be oriented at a variety of angles with said lid, said chute having a bottom end, a top end and an outside wall extending between said bottom end and said top end, said outside wall having a rigid portion and a flexible portion, said rigid portion extending from said bottom end toward said top end, said bottom end being coupled to said primary wall having said chute extending upwardly from said lid, said bottom end being aligned with said hole, said flexible portion forming accordion-like folds such that said flexible portion is extendable and bendable.

* * * * *